US012028195B2

United States Patent
Lopez

(10) Patent No.: US 12,028,195 B2
(45) Date of Patent: Jul. 2, 2024

(54) METHOD, TRANSMITTER, STRUCTURE, TRANSCEIVER AND ACCESS POINT FOR PROVISION OF MULTI-CARRIER ON-OFF KEYING SIGNAL

(71) Applicant: Telefonaktiebolaget LM Ericsson (publ), Stockholm (SE)

(72) Inventor: Miguel Lopez, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/341,075

(22) Filed: Jun. 26, 2023

(65) Prior Publication Data

US 2023/0336385 A1  Oct. 19, 2023

Related U.S. Application Data

(63) Continuation of application No. 17/750,755, filed on May 23, 2022, now Pat. No. 11,750,425, which is a continuation of application No. 17/263,218, filed as application No. PCT/EP2019/068123 on Jul. 5, 2019, now Pat. No. 11,362,869.

(60) Provisional application No. 62/712,407, filed on Jul. 31, 2018.

(51) Int. Cl.
*H04L 27/04* (2006.01)
*H04L 5/00* (2006.01)

(52) U.S. Cl.
CPC ............ *H04L 27/04* (2013.01); *H04L 5/0007* (2013.01)

(58) Field of Classification Search
CPC .............................. H04L 27/02; H04L 27/04
See application file for complete search history.

(56) References Cited

U.S. PATENT DOCUMENTS

| | | | |
|---|---|---|---|
| 8,266,194 B2 | 9/2012 | Kaluzhny | |
| 2018/0152333 A1* | 5/2018 | Shellhammer | ...... H04L 27/2614 |
| 2018/0295578 A1* | 10/2018 | Liu | ............... H04W 52/0229 |
| 2019/0342828 A1* | 11/2019 | Shellhammer | .... H04W 52/0212 |

FOREIGN PATENT DOCUMENTS

| | | |
|---|---|---|
| CN | 1473423 A | 2/2004 |
| CN | 101471750 B | 7/2011 |
| CN | 105119854 A | 12/2015 |

(Continued)

OTHER PUBLICATIONS

International Search Report and Written Opinion dated Nov. 13, 2019 for International Application No. PCT/EP2019/068123 filed Jul. 5, 2019, consisting of 16-pages.

(Continued)

*Primary Examiner* — Kevin Kim
(74) *Attorney, Agent, or Firm* — Weisberg I.P. Law. P.A.

(57) ABSTRACT

A method of transmitting an On-Off Keying, OOK, signal includes an ON waveform and an OFF waveform forming a pattern representing transmitted information. The method includes obtaining a basic baseband waveform; scrambling the basic baseband waveform by applying a first binary randomised sequence where one of the binary values cause transformation to a complex conjugate, modulating the information to be transmitted by applying the scrambled basic baseband waveform for the ON waveform and applying no waveform for the OFF waveform; and transmitting the modulated information.

20 Claims, 12 Drawing Sheets

(56) References Cited

FOREIGN PATENT DOCUMENTS

| | | | |
|---|---|---|---|
| JP | 2008228201 A | 9/2008 | |
| JP | 2008278049 A | 11/2008 | |
| JP | 2008283288 A | 11/2008 | |
| JP | 2009523359 A | 6/2009 | |
| JP | 2009533006 A | 9/2009 | |
| KR | 20070088560 A | 8/2007 | |
| KR | 20100045531 A | 5/2010 | |
| KR | 100964777 B1 | 6/2010 | |
| KR | 20130064784 A | 6/2013 | |
| KR | 20210018935 A | 2/2021 | |
| RU | 2517191 C2 | 5/2014 | |
| RU | 2582570 C2 | 4/2016 | |
| WO | 9110182 A1 | 7/1991 | |
| WO | 2019109797 A1 | 6/2019 | |

OTHER PUBLICATIONS

International Preliminary Report on Patentability dated Nov. 20, 2020 for International Application No. PCT/EP2019/068123 filed Jul. 5, 2019, consisting of 30-pages.
ETSI EN 300 328 V2.1.1 Wideband transmission systems; Data transmission equipment operating in the 2,4 GHz ISM band and using wide band modulation techniques; Harmonised Standard covering the essential requirements of article 3.2 of Directive 2014/53/EU, Nov. 2016, consisting of 101-pages.
Shellhammer et al. Qualcomm; IEEE P802.11 Wireless LANs—LB2005—Proposed Draft WUR PHY Specification, Jan. 2018, consisting of 15-pages.
Shellhammer et al. Qualcomm; IEEE P802.11-18/1302r0 Wireless LANs; Spec Text on MC-OOK Symbol Randomization, Jul. 2018, consisting of 5-pages.
Shellhammer et al. Qualcomm; doc.: IEEE 802.11-18/0824r1; WUR Power Spectral Density, May 2018, consisting of 16-pages.
Russian Office Action dated Apr. 21, 2021 for Application No. 2021104731/07, consisting of 10-pages.
Japanese Office Action with English Summary Translation date Apr. 5, 2022 for Patent Application No. 2021504327, consisting of 6-pages.
Miguel Lopez; Spectral line suppression for MC-OOK; IEEE 802.11-18/1179r1; IEEE; Jul. 9, 2018, consisting of 14-pages.
Steve Shellhammer; WUR Power Spectral Density; IEEE 802.11-18/0824r1; IEEE; May 9, 2018, consisting of 17-pages.
Korean Notice of Allowance with English Machine Translation dated Aug. 4, 2022 for Patent Application No. 9-5-2022-058901586, consisting of 6 pages.
Japanese Office Action and English Summary dated Jun. 27, 2023 for Application No. 20222-108078, consisting of 9 pages.
Japanese Notice to Grant and English machine translation dated Apr. 16, 2024 for Application No. 2022-108078, consisting of 6 pages.
Shellhammer et al. IEEE P802.11 Wireless LANs "Spec Text on MC-OOK Symbol Randomization" IEEE P802.11-18/1567r2; Sep. 2018, consisting of 9 pages.

\* cited by examiner

METHOD, TRANSMITTER, STRUCTURE, TRANSCEIVER AND ACCESS POINT FOR PROVISION OF MULTI-CARRIER ON-OFF KEYING SIGNAL

CROSS REFERENCE TO RELATED APPLICATIONS

This Application is a continuation of U.S. patent application Ser. No. 17/750,755, filed May 23, 2022, entitled "METHOD, TRANSMITTER, STRUCTURE, TRANSCEIVER AND ACCESS POINT FOR PROVISION OF MULTI-CARRIER ON-OFF KEYING SIGNAL", which is a continuation of U.S. patent application Ser. No. 17/263,218, filed Jan. 26, 2021, entitled "METHOD, TRANSMITTER, STRUCTURE, TRANSCEIVER AND ACCESS POINT FOR PROVISION OF MULTI-CARRIER ON-OFF KEYING SIGNAL", which claims priority to International Application Serial No. PCT/EP2019/068123, filed Jul. 5, 2019, which claims the benefit of U.S. Provisional Application No. 62/712,407, filed Jul. 31, 2018, the entirety of both of which is incorporated herein by reference.

TECHNICAL FIELD

The present disclosure generally relates to an approach for transmitting an On-Off Keying, OOK, signal. In particular, the disclosure relates to low-complexity implementation of providing and transmitting such a signal.

BACKGROUND

On-off keying (OOK) is a binary modulation, where a logical one is represented with sending a signal (ON) whereas a logical zero is represented by not sending a signal (OFF). Here, one of the states may represent one binary symbol value and the other state will then represent the other binary symbol. Patterns of the states may represent a binary symbol, e.g. as provided through Manchester coding.

Wake-up receivers (WUR), sometimes also referred to as wake-up radios, provide a means to significantly reduce the power consumption in receivers used in wireless communication. The idea with a WUR is that it can be based on a very relaxed architecture, as it only needs to be able to detect the presence of a wake-up signal but will not be used for any data reception.

A feasible modulation for the wake-up packet (WUP), i.e., the signal sent to the WUR, is the OOK. In the IEEE 802.11 draft specification, see IEEE 802.11-18/0152r5 with title "Proposed Draft WUR PHY Specification", the WUP is called WUR Physical Protocol Data Unit (PPDU).

There are currently activities ongoing in the IEEE 802.11 task group (TG) named IEEE 802.11ba to standardize the physical (PHY) and medium access (MAC) layers for a Wake-Up Radio to be used as a companion radio to an IEEE 802.11 primary communications radio (PCR) with the mere purpose to significantly reduce the power consumption of stations equipped with both WUR and PCR.

FIG. 1 illustrates the WUR and PCR, e.g. for IEEE 802.11 communication, share the same antenna. When the WUR is turned on and waiting for the wake-up message, the IEEE 802.11 chipset can be switched off to preserve energy. Once the wake-up message is received by the WUR, it wakes up the PCR and starts e.g. Wi-Fi communication with an access point (AP).

In IEEE 802.11-18/0152r5 with title "Proposed Draft WUR PHY Specification" mentioned above, it is proposed to apply Manchester coding to the information bits of the WUP. That is, for example a logical "0" is encoded as "10" and a logical "1" as "01". Therefore, every data symbol comprises an "ON" part (where there is energy) and an "OFF" part, where there is no energy. In addition, it is proposed to generate the WUP by means of an inverse fast Fourier transform (IFFT), as this block is already available in Wi-Fi transmitters supporting e.g. IEEE 802.11a/g/n/ac. Specifically, an approach discussed for generating the OOK is to use the 13 sub-carriers in the centre, and then populating these with some signal to represent ON and to not transmit anything at all to represent OFF. This approach differs slightly from traditional OOK in that multiple carriers are used to generate the ON part. Therefore, the OOK scheme being standardized in IEEE 802.11ba is referred to as multicarrier OOK (MC-OOK). The IFFT has 64 points and is operating at a sampling rate of 20 MHz, and just as for ordinary orthogonal frequency division multiplexing (OFDM) a cyclic prefix (CP) is added after the IFFT operation in order to have the OFDM symbol duration as being used in IEEE 802.11a/g/n/ac. An important feature of MC-OOK is that the same OFDM symbol is used to generate MC-OOK. In other words, the same frequency domain symbols are used to populate the non-zero subcarriers for all data symbols. Using the same OFDM symbol to generate the "ON" part of every Manchester coded data symbol has some advantages. For example, it allows coherent reception of the MC-OOK. Moreover, the generation of ON waveform can be inclined to have low peak to average power ratio and/or can be inclined for performance.

FIG. 2 schematically illustrates a traditional structure for OOK generation. The signal to be transmitted, e.g. the bits for the WUP, is for example Manchester coded in a Manchester-based encoder 200. The encoded signal controls which output signal to provide during a next symbol time, $T_{sym}$, e.g. by a switch arrangement 202. $T_{sym}$ may for example be 2 μs for a high data rate or it may be 4 μs for a low data rate. The switching is made between a signal provided by an ON signal waveform generator (WG) 204, which in the present approach provides a multicarrier signal mimicking the desired ON signal, and a signal provided by an OFF signal waveform generator (WG) 206, which in the present approach provides a zero signal. The switching arrangement 202 outputs a signal sequence to be transmitted, which is traditionally processed and wirelessly transmitted.

The multicarrier signal referred to above is normally generated by means of an inverse fast Fourier transform (IFFT), as this block may already be available in some transmitters such as for example Wi-Fi transmitters supporting e.g. IEEE 802.11a/g/n/ac. FIG. 3 schematically illustrates a structure for generating a basic baseband waveform (BW) using IFFT. An example approach for generating the multicarrier signal to represent a WUP is to use 13 subcarriers in the centre of an OFDM multi-carrier signal, and populating these 13 sub-carriers with a signal to represent ON and to not transmit anything at all to represent OFF. This may be referred to as multicarrier OOK (MC-OOK). In one example, the IFFT has 64 points and is operating at a sampling rate of 20 MHz, and just as for ordinary orthogonal frequency division multiplexing (OFDM) a cyclic prefix (CP) is added after the IFFT operation in order to have the OFDM symbol duration as being used in IEEE 802.11a/g/n/ac. In some examples of MC-OOK for a WUP, the same OFDM symbol is used. In other words, the same frequency domain symbols are used to populate the non-zero subcarriers for all data symbols. Using the same OFDM symbol to generate the "ON" part of every Manchester coded data symbol may result in strong periodic time correlations in the data part of the WUP. These correlations give rise to spectral lines, as illustrated in FIG. 4, which are spikes in the Power Spectral Density (PSD) of the WUP. These spectral lines may in some examples be undesirable because there may be local geographic regulations that limit the power that can be transmitted in narrow portions of the spectrum.

The present disclosure aims for providing improvements on generation of the ON part.

MC-OOK is used to generate the WUP. Moreover, the same OFDM symbol is used to generate the "ON" part of every Manchester coded information symbol. Because the OFDM symbol is repeated in every information symbol, there are strong periodic time correlations in the payload of the WUP. These correlations give rise to spectral lines, which are spikes in the Power Spectral Density (PSD) of the WUP. The PSD of the generated multicarrier signal is illustrated in FIG. 4.

For example, in the USA, the Federal Communications Commission requires that digitally modulated signals in the 2.4 MHz band transmit a power less than 8 dBm in any 3 kHz band. Hence, the presence of spectral lines may limit the maximum transmit power for the WUP to a value that is less than what would be allowed if spectral lines were not present.

FIG. 5 schematically illustrates a structure for a phase randomisation technique to smooth power spectral density spikes of a signal as of FIG. 4. The approach is that each symbol is binary rotated with either 0 or 180 degrees (i.e., multiplied with either +1 or −1, such that a mutual phase difference of $\pi$ is achieved). The rotation is chosen pseudo-randomly. This symbol randomization method is illustrated in FIG. 5. A pseudo-random bit stream is used to generate binary phase shift keyed, BPSK, symbols, taking on the values +1 and −1, and the On waveform is then multiplied by this binary symbol.

FIG. 6 gives an illustration of how the symbol randomization technique proposed in above eliminates the spectral lines. Diagrams of FIG. 4 and FIG. 6 have been produced using the same basic baseband waveform generated by the waveform generator. The difference is that the basic baseband waveform has been used to produce the diagram of FIG. 4, while the scrambled waveform has been used to produce the diagram of FIG. 6.

Although the spectral lines are removed, the PSD is dependent on the frequency response of the On waveform, since phase randomization discussed above does not alter the energy distribution over frequency. The PSD shown in FIG. 6 exhibits lack of symmetry and flatness. Lack of spectral flatness is a disadvantage in some regulatory domains. For example, in Europe, for equipment operating in the 2.4 GHz band and using wideband modulation techniques, the maximum power spectral density is limited to 10 mW per MHz. Hence, subject to this PSD constraint, the output power is maximized when the PSD is flat. For example, due to the PSD limits in Europe, a WUP having a PSD as in FIG. 6 would have a total output power of 28 mW, whereas a signal having the same bandwidth (4 MHz) but with a flat PSD could have a total output power of 40 mW (10 mW/MHz×4 MHz). Therefore, an approach which yield improved spectral flatness is sought.

The above information disclosed in this Background section is only for enhancement of understanding of the background of the disclosure and therefore it may contain information that does not form the prior art that is already known to a person of ordinary skill in the art.

SUMMARY

The disclosure is based on the inventor's realization that randomly applying complex conjugation cause flattening of the PSD.

According to a first aspect, there is provided a method of transmitting an On-Off Keying, OOK, signal which comprises an ON waveform and an OFF waveform forming a pattern representing transmitted information. The method comprises obtaining a basic baseband waveform, scrambling the basic baseband waveform by applying a first binary randomised sequence where one of the binary values cause transformation to a complex conjugate, modulating the information to be transmitted by applying the scrambled basic baseband waveform for the ON waveform and applying no waveform for the OFF waveform, and transmitting the modulated information.

The obtaining of the basic baseband waveform may comprise generating an Orthogonal Frequency Division Multiplexing signal mimicking a desired baseband waveform. The desired baseband waveform may correspond to a multicarrier on-off keying, MC-OOK, symbol.

The scrambling of the basic baseband waveform may comprise applying a second binary randomised sequence where binary values apply phase rotations which are mutually separated by $\pi$. The first randomised sequence may be generated in a shift register mechanism representing a first polynomial and the second randomised sequence is generated in a shift register mechanism representing a second polynomial different from the first polynomial. The shift register mechanism may use a single shift register for the generation of both the first and the second binary randomised sequences, where the first binary randomised sequence is tapped at a first position of the single shift register and the second binary randomised sequence is tapped at a second position of the single shift register, and the first and second positions of the single shift register are different.

According to a second aspect, there is provided a transmitter for transmitting an On-Off Keying, OOK, signal which comprises an ON waveform and an OFF waveform forming a pattern representing transmitted information. The transmitter comprises a basic waveform input arranged to obtain a basic baseband waveform, a scrambler arranged to scramble the basic baseband waveform by applying a first binary randomised sequence where one of the binary values cause transformation to a complex conjugate, a modulator arranged to modulate the information to be transmitted by applying the scrambled basic baseband waveform for the ON waveform and applying no waveform for the OFF waveform, and a transmitter circuit arranged to transmit the modulated information.

The transmitter may comprise a basic baseband waveform generator, wherein the basic baseband waveform generator is arranged to generate the basic baseband waveform as an Orthogonal Frequency Division Multiplex signal mimicking a desired baseband waveform, and is arranged to provide the basic baseband waveform to the basic waveform input. The desired baseband waveform may correspond to a multicarrier on-off keying, MC-OOK, symbol.

The scrambler may be arranged to apply a second binary randomised sequence where binary values apply phase rotations which are mutually separated by $\pi$. The first randomised sequence may be generated in a shift register mechanism representing a first polynomial and the second randomised sequence is generated in a shift register mechanism representing a second polynomial different from the first polynomial. The transmitter may comprise a shift register, wherein the shift register mechanism uses the shift register for the generation of both the first and the second binary randomised sequences, where the first binary randomised sequence is tapped at a first position of the shift register and the second binary randomised sequence is tapped at a second position of the shift register, and the first and second positions of the shift register are different.

According to a third aspect, there is provided a computer program comprising instructions which, when executed on a processor of a communication apparatus, causes the communication apparatus to perform the method according to the first aspect.

According to a fourth aspect, there is provided a structure for generating sequences. The structure comprises a binary shift register, a feedback structure connected to the shift register arranged to define a linear feedback shift register according to a polynomial, a first output arranged to collect one or more state values from a first group of elements of the shift register, wherein said one or more state values from the first group form a value of a first sequence, and a second output arranged to collect one or more state values from a second group of elements of the shift register, wherein said one or more state values from the second group form a value of a second sequence, and wherein no element of the second group belongs to the first group.

The second output may be arranged to collect state values from the second group of element, the second group comprising a plurality of elements of the shift register such that the second sequence comprises symbols having more than two possible values. Alternatively, the second sequence is a binary sequence. The second output may then be arranged to collect state values from the second group of elements, where the second group comprises a single element of the shift register.

The first output may be arranged to collect state values from the first group comprising a plurality of elements of the shift register such that the first sequence comprises symbols having more than two possible values. Alternatively, the first sequence is a binary sequence. The first output may then be arranged to collect state values from the first group of elements, where the first group comprises a single element of the shift register.

According to a fifth aspect, there is provided a transceiver comprising a transmitter according to the second aspect, and a structure according to the fourth aspect, wherein the structure is arranged to provide the first and second sequences for the transmitter.

According to a sixth aspect, there is provided an access point of a wireless network, wherein the access point is arranged to transmit a wake-up packet using multicarrier on-off keying. The access point comprises a transmitter according to the second aspect or a transceiver according to the fifth aspect.

The approach according to some embodiments flattens PSD of the signal used for the WUP, and for some embodiments eliminates spectral lines. An advantage is possibility for increased output power in regulatory domains that impose limits on the PSD.

An advantage of some embodiments is the possibility for very low implementation complexity.

An advantage of some embodiments is that the approach preserves the properties of the On waveform. For example, if the On waveform has been designed to have low peak-to-average power ratio, PAPR, then the method of the disclosure preserves the PAPR. Similarly, if the On waveform has been optimized for performance in some propagation channel, then the disclosed approach preserves the performance.

An advantage of some embodiments is the low complexity of implementation of a structure which provides multiple sequences with low mutual correlation.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

FIG. 6) and a complex conjugate of the signal.

DETAILED DESCRIPTION

Figure 7:
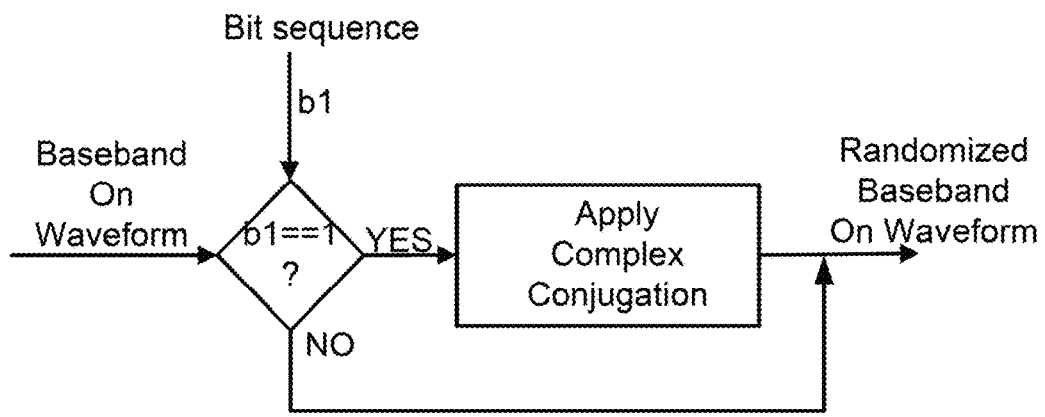
FIG. 7 schematically illustrate a structure for flattening power spectral density of a waveform according to an embodiment.

FIG. 7 schematically illustrate a structure for flattening power spectral density of a waveform according to an embodiment. A binary bit sequence with proper randomisation is provided, and for each bit value b1 a baseband waveform is substituted by its complex conjugate for one of the states of the bit value and kept unchanged for the other state of the bit value. The randomised complex conjugation will flatten the PSD of the output of the structure.

Figure 6:
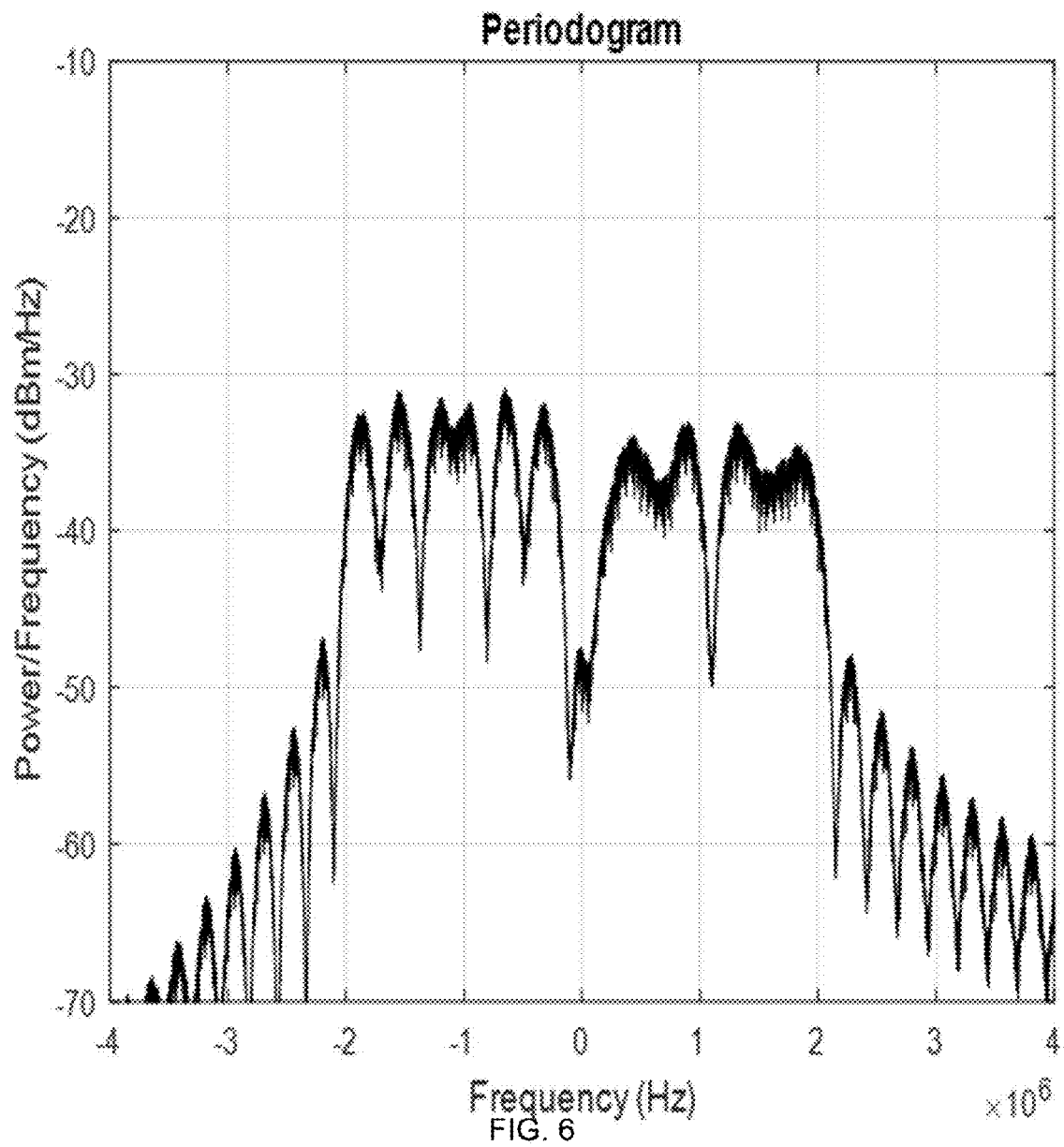
FIG. 6 is a signal diagram illustrating power spectral density of a smoothened waveform by the structure of FIG. 5.
Figure 8:
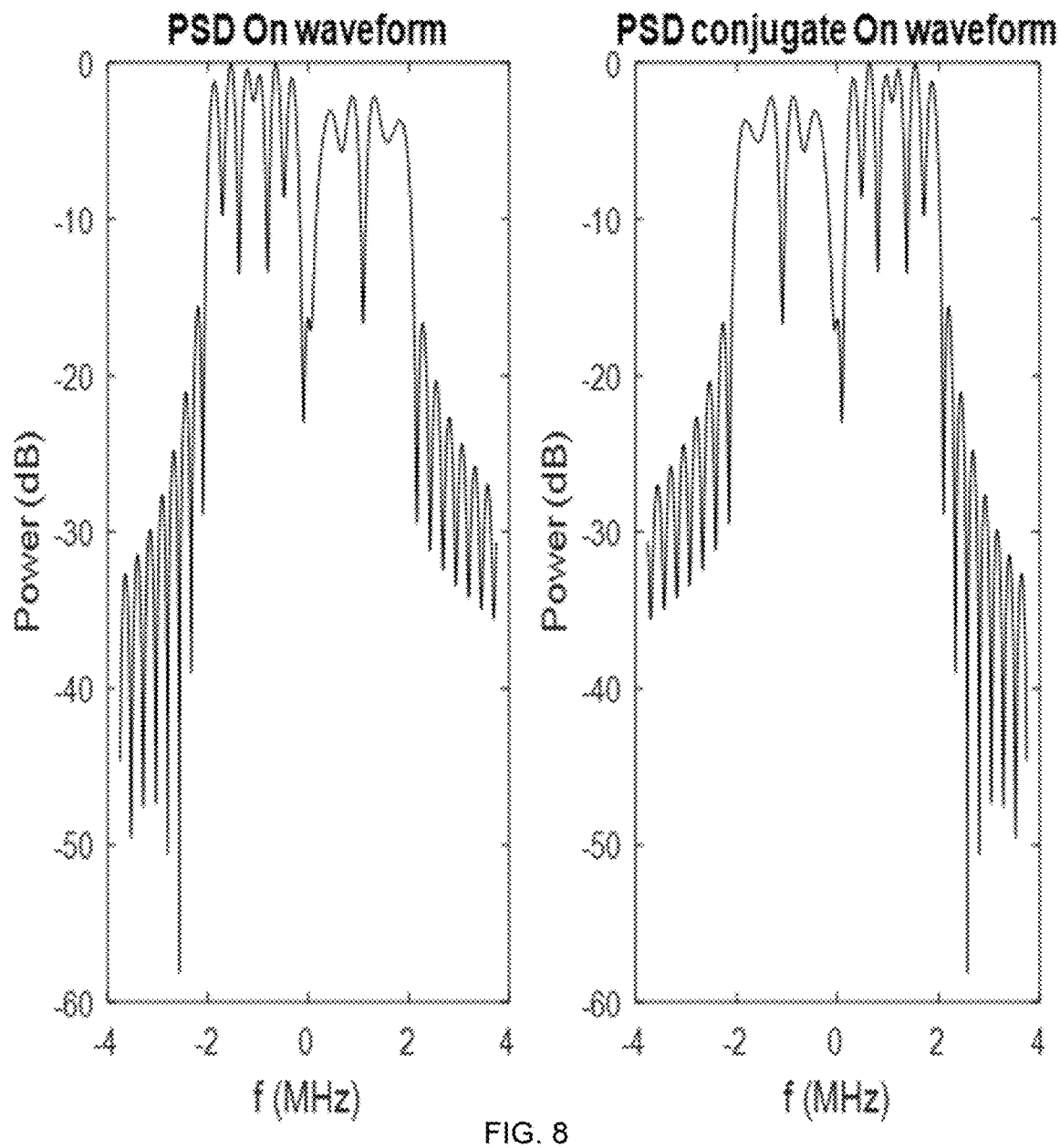
FIG. 8 illustrates signal diagrams of power spectral densities of a signal (Cf.

FIG. 8 illustrates signal diagrams of power spectral densities of a signal (Cf. FIG. 6) and a complex conjugate of the signal. By the randomised substitution with the complex conjugate version of the basic baseband waveform, an alternative OFDM signal is randomly provided, with spectral content as illustrated to the right in FIG. 8. The alternative OFDM signal provides the same envelope as the basic baseband waveform, but with a different spectral content. This is due to that the waveform obtained by complex conjugating a time domain OFDM waveform can also be generated by transforming to the time domain a frequency domain signal comprising frequency domain symbols that are the complex conjugates of the frequency domain symbols of the original signal, and reversing the order of the subcarriers. For example, if an OFDM signal is generated from complex-valued frequency domain symbols $X_k$, where k=−M, . . . , M, by means of an IFFT, then the complex conjugate of said OFDM signal can be generated by applying an inverse discrete Fourier transform to the frequency domain symbols $X^*_{-k}$, where the star * represents complex conjugation and the minus sign in the index k indicates reversal of the order of the subcarriers. The randomised provision of the variants, i.e. sometimes with spectral content as illustrated to the left in FIG. 8 and sometimes with spectral content as illustrated to the right in FIG. 8, provides for the flatter waveform in average, which will be demonstrated with reference to FIG. 10 below illustrating a simulated result of one embodiment of the approach.

Figure 5:
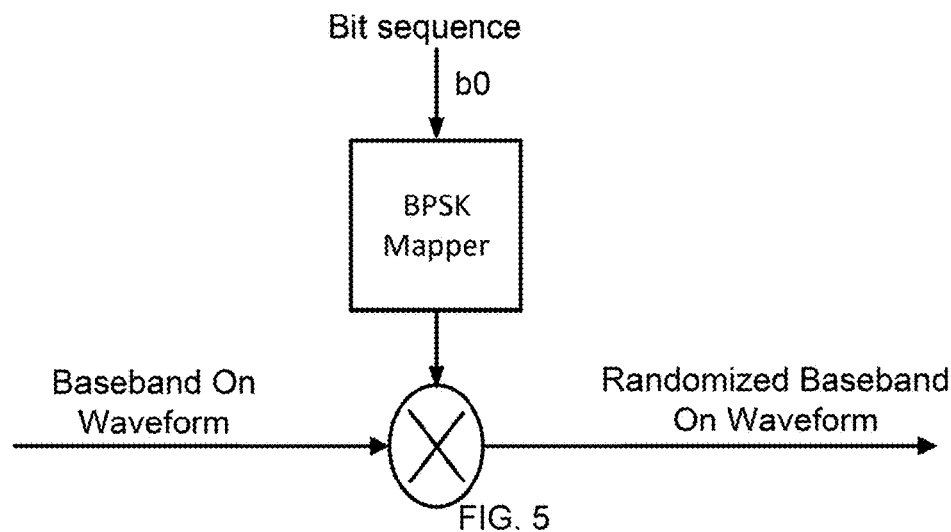
FIG. 5 schematically illustrates a structure for a phase randomisation technique to smooth power spectral density spikes of a signal as of FIG. 4.
Figure 9:
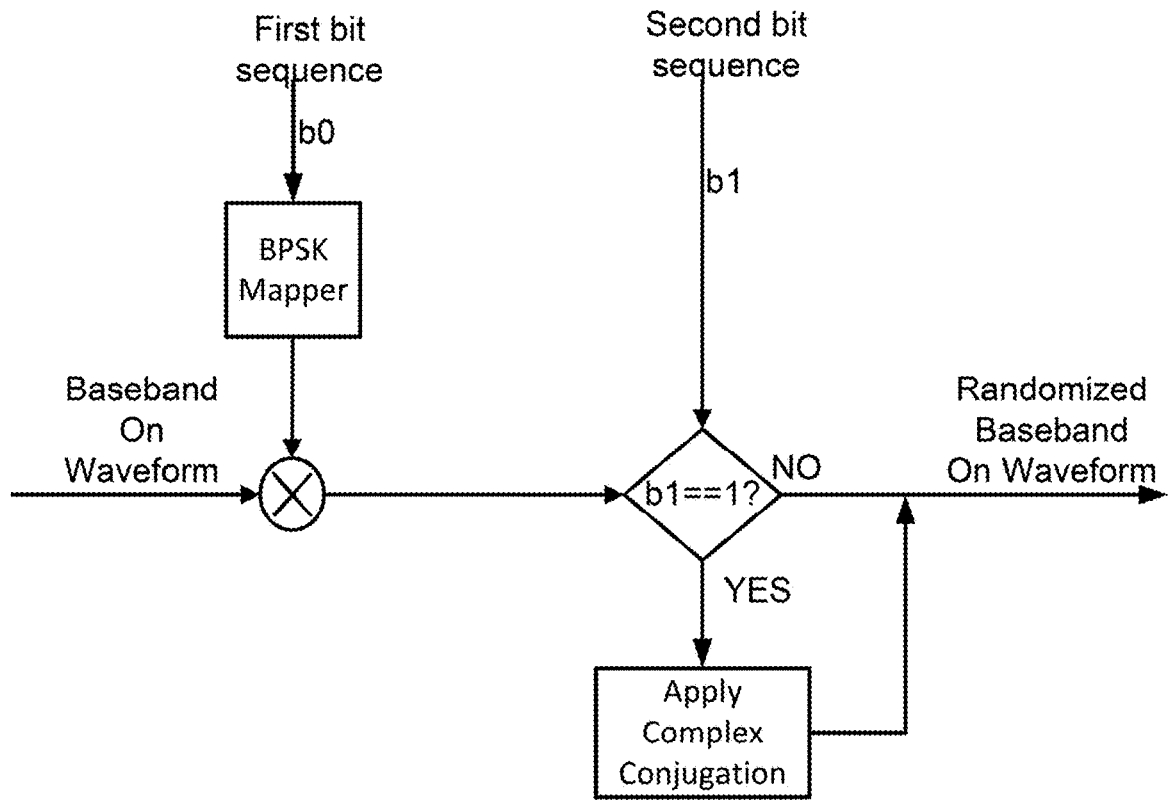
FIG. 9 illustrates an alternative structure for flattening power spectral density of a waveform according to an embodiment.

FIG. 9 illustrates an alternative structure for flattening power spectral density of a waveform according to an embodiment. Here, the spectral line suppression feature demonstrated with FIG. 5 is applied together with an approach similar to the one demonstrated with reference to FIG. 7. This structure will thus do spectral line suppression and PSD flattening.

Figure 3:
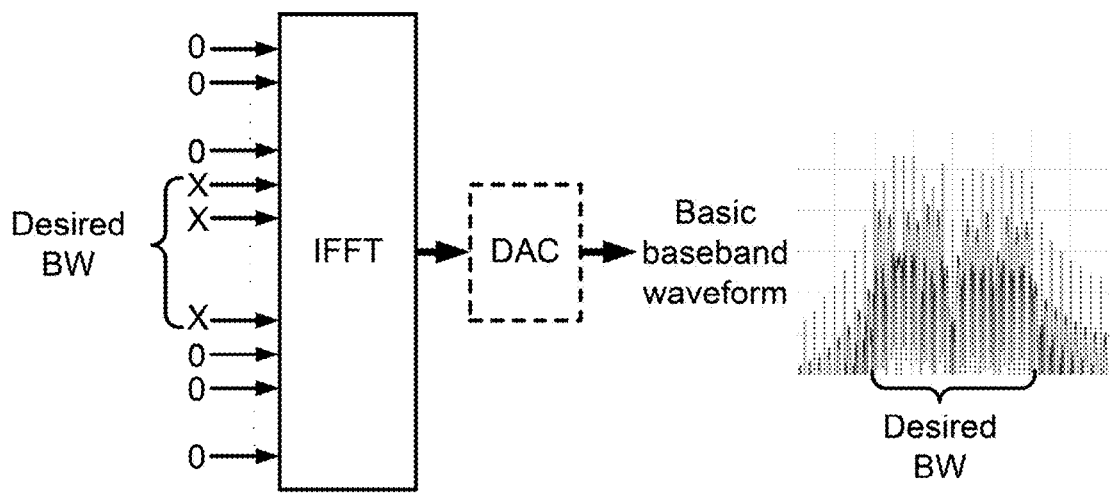
FIG. 3 schematically illustrates a structure for generating a basic baseband waveform using IFFT.
Figure 4:
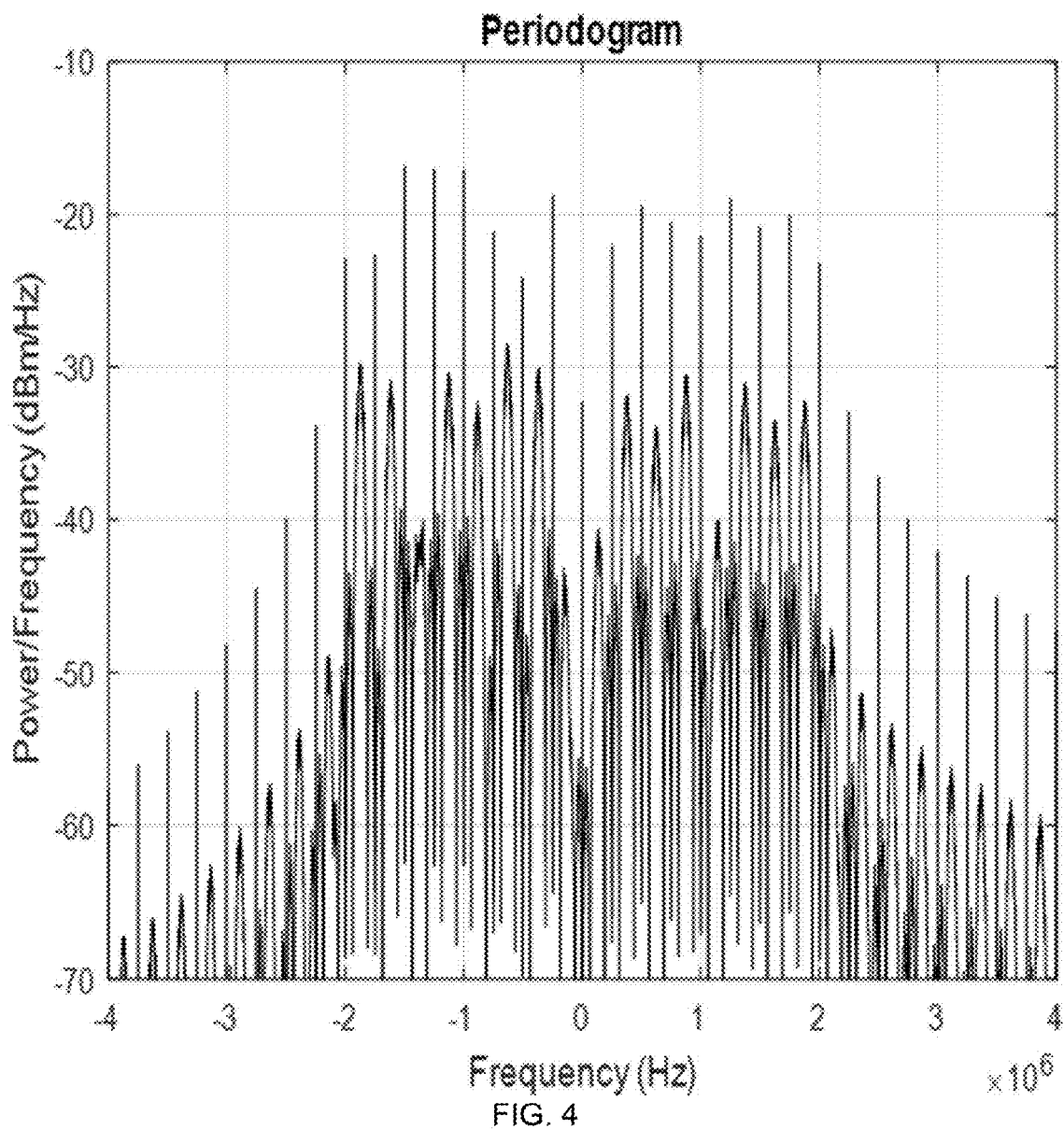
FIG. 4 is a signal diagram illustrating power spectral density of a basic baseband waveform generated by a structure according to FIG. 3.
Figure 10:
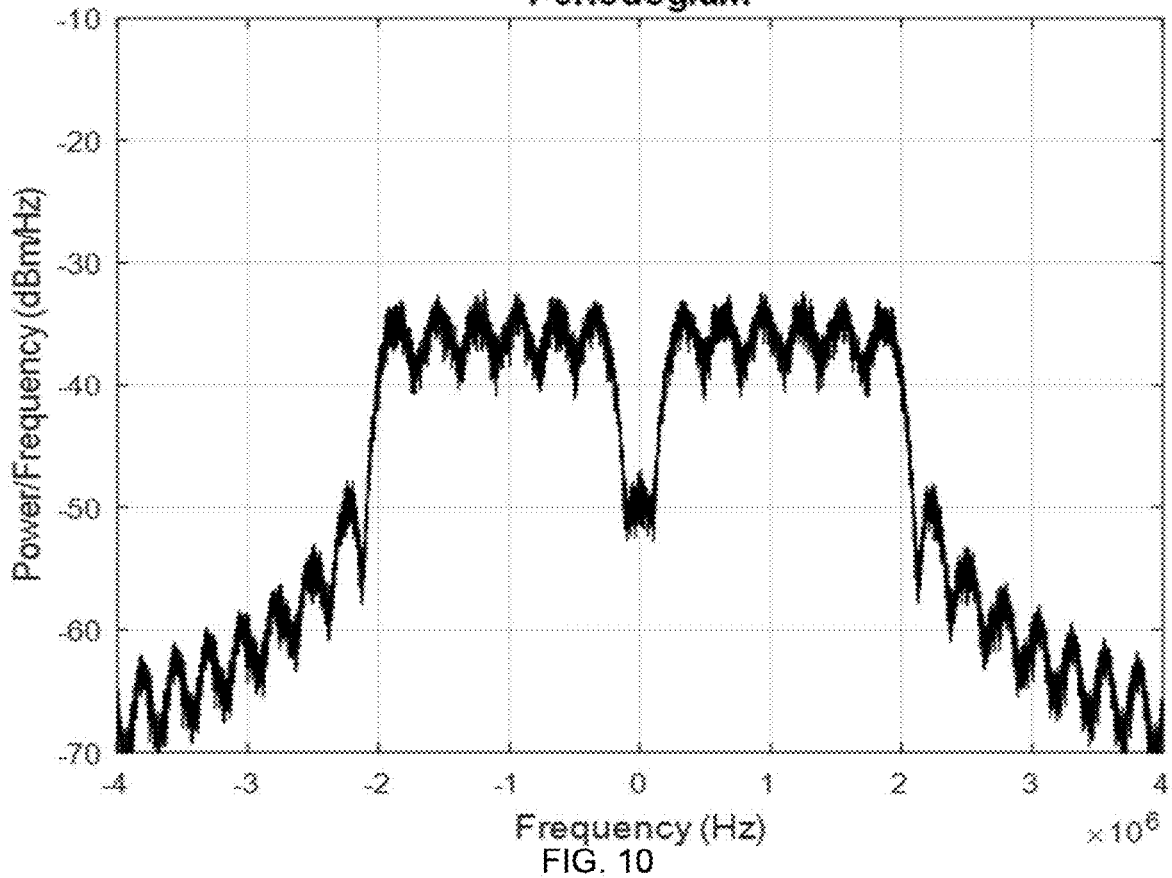
FIG. 10 is a signal diagram illustrating a flattened power spectral density using an embodiment.

FIG. 10 is a signal diagram illustrating a flattened power spectral density using an embodiment. This is for example a result achieved when applying the structure demonstrated with reference to FIG. 9 on a basic baseband signal generated by a generator structure as demonstrated with reference to FIG. 3. The PSD is fairly flat and free from spectral lines, and thus provides good performance for use in an OOK provision structure.

Referring back to the discussion in the background section about the limitations in output power, a discussion about the benefits of the flattened PSD illustrated by the diagram of FIG. 10 will now be given. Subject to the PSD limits in for example Europe, a WUP having a PSD as in the diagram of FIG. 10 would have a total output power of 35 mW, given the same other features as of the example in the background section. Note that although the same basic baseband On waveform is used to generate FIG. 6 and FIG. 10, the output power in PSD limited regulatory domains is 1 dB larger if the transmitter is implemented according to the approach providing the PSD as of FIG. 10 than according to traditional techniques providing the PSD as of FIG. 6.

Figure 1:
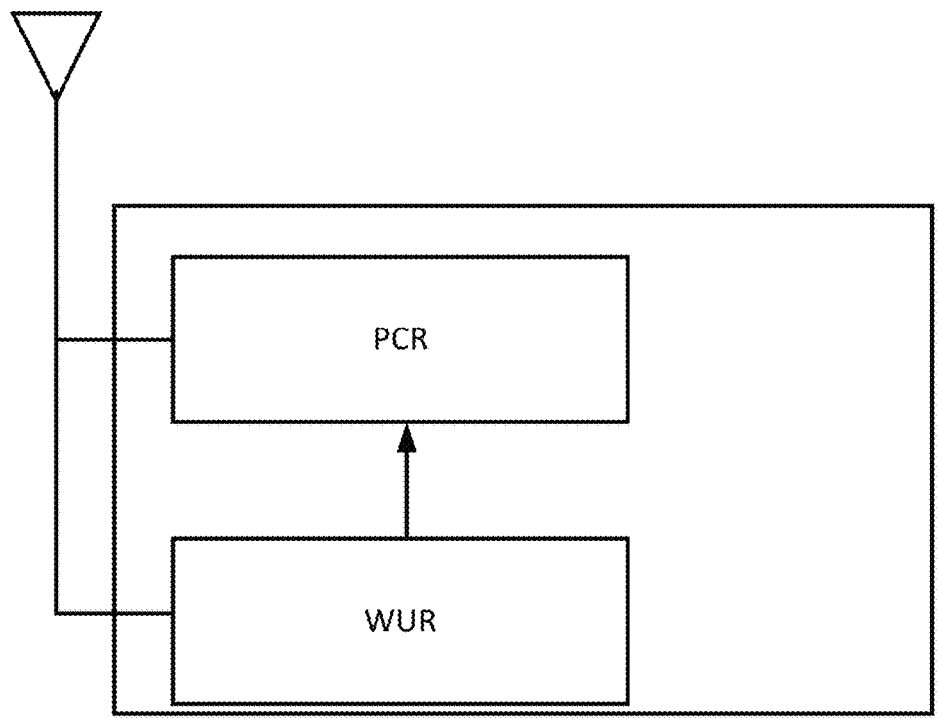
FIG. 1 schematically illustrates a receiver having a traditional WUR and PCR structure.
Figure 2:
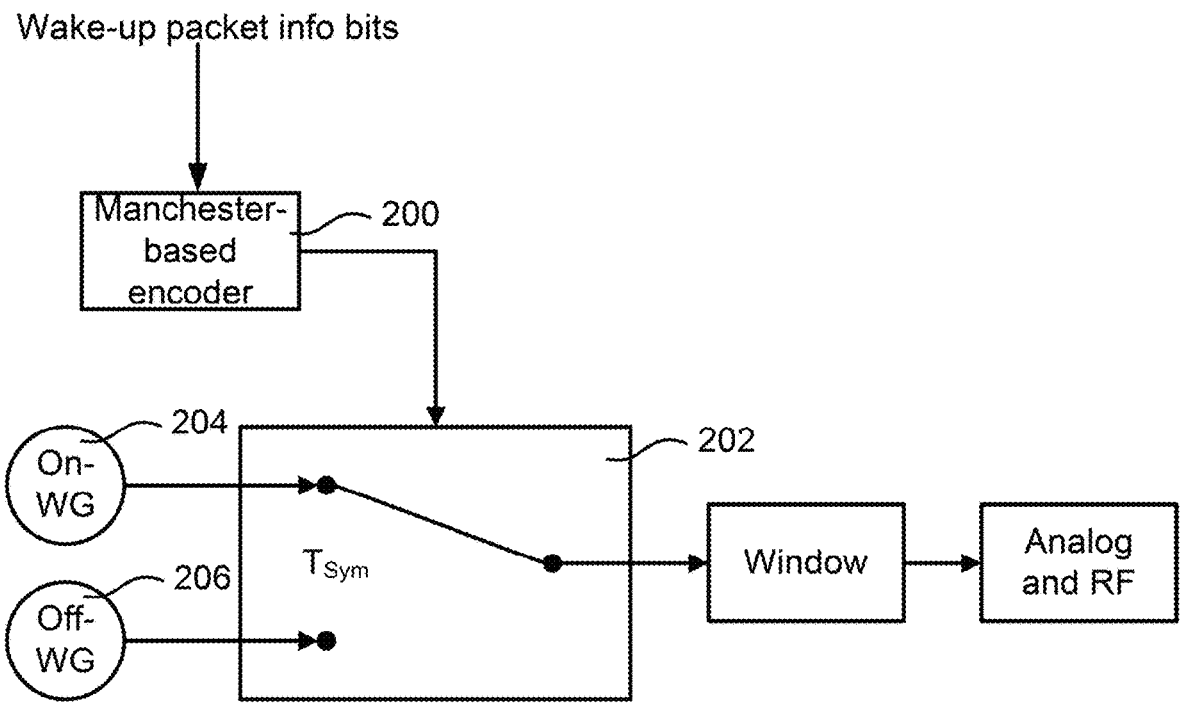
FIG. 2 schematically illustrates a traditional OOK structure.
Figure 11:
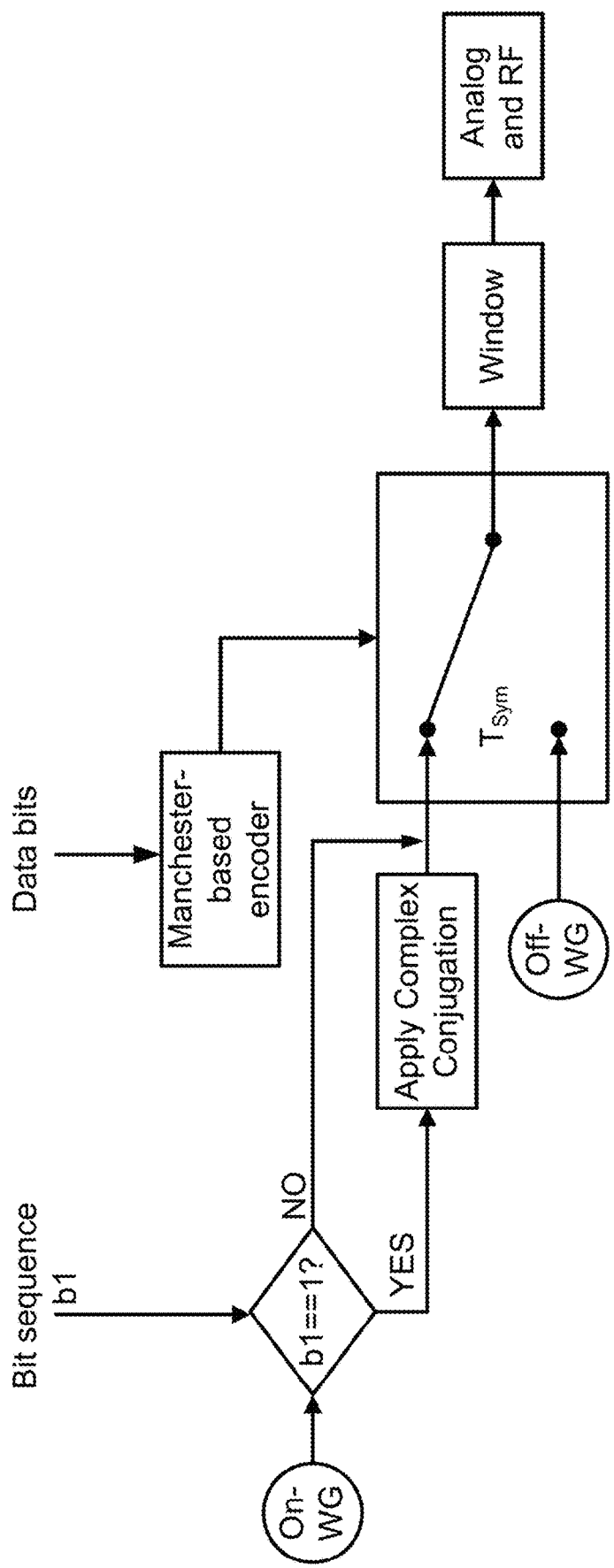
FIG. 11 schematically illustrates a transmitter according to an embodiment.

FIG. 11 schematically illustrates a transmitter according to an embodiment. In brief, the transmitter is arranged for OOK similar to the structure which has been demonstrated with reference to FIG. 2 but with a PSD flattening structure similar to the structure which has been demonstrated with reference to FIG. 7. The ON waveform generator (WG) providing the waveform to the PSD flattening structure may be similar to the generator demonstrated with reference to FIG. 3.

Figure 12:
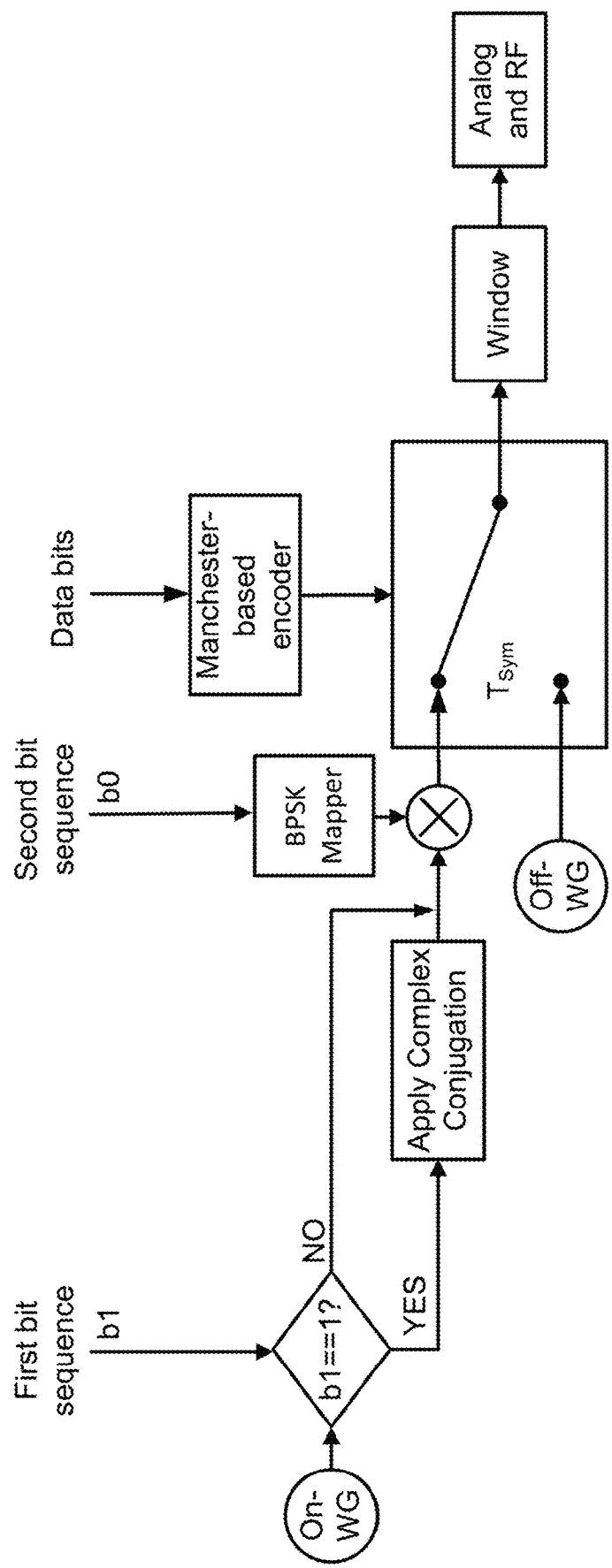
FIG. 12 schematically illustrates a transmitter according to an embodiment.

FIG. 12 schematically illustrates a transmitter according to an embodiment. In brief, the transmitter is arranged for OOK similar to the structure which has been demonstrated with reference to FIG. 2 but with a PSD flattening structure similar to the structure which has been demonstrated with reference to FIG. 7 and a spectral line suppression structure similar to the one which has been demonstrated with reference to FIG. 5. The ON waveform generator (WG) providing the waveform to the PSD flattening structure may be similar to the generator demonstrated with reference to FIG. 3.

Figure 13:
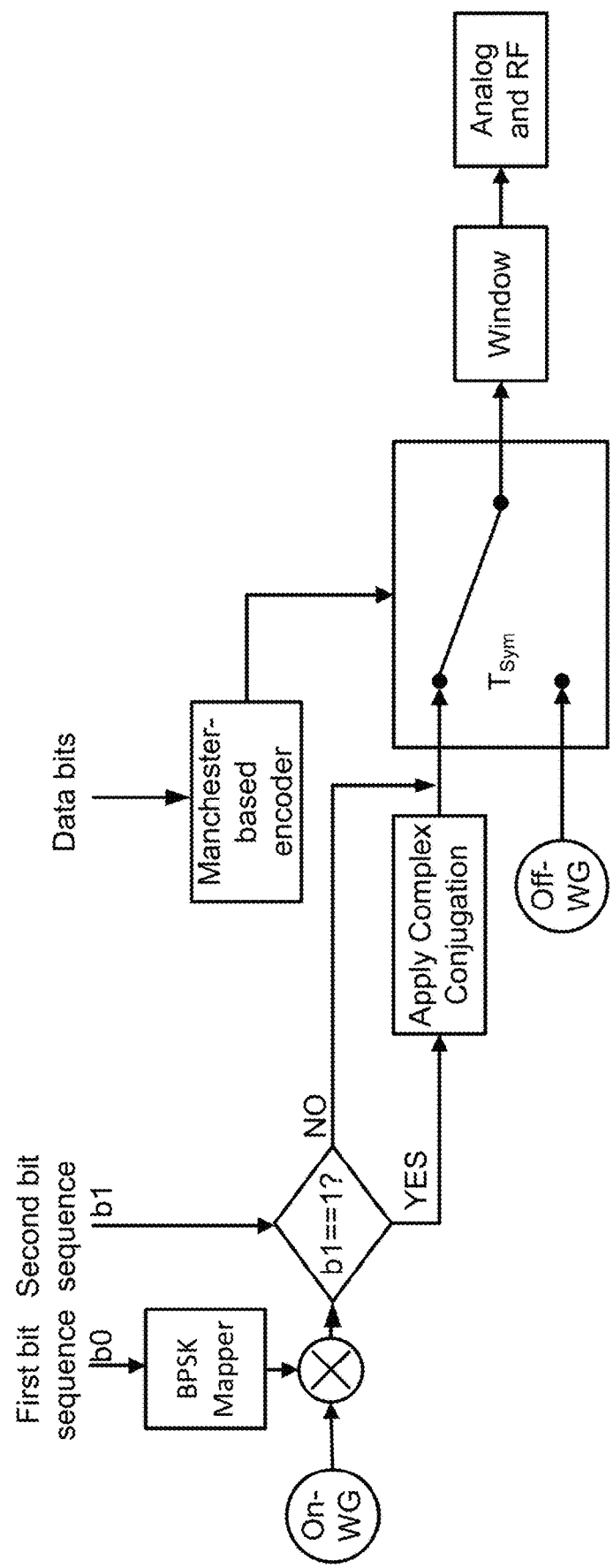
FIG. 13 schematically illustrates a transmitter according to an embodiment.

FIG. 13 schematically illustrates a transmitter according to an embodiment. In brief, the transmitter has a similar structure as the one demonstrated with reference to FIG. 12, but with the spectral line suppression structure similar to the one which has been demonstrated with reference to FIG. 5 connected to the waveform generator and then the PSD flattening structure similar to the structure which has been demonstrated with reference to FIG. 7 provided between the spectral line suppression structure and the OOK structure.

The bit sequences provided to the PSD flattening structure for providing a randomised application of the complex conjugate may be provided in a variety of ways. One way is to use a pseudorandom sequence generator based on a linear feedback shift register. Another way is to collect a sequence from a look-up table. Below, with reference to FIGS. 14 to 16, there are demonstrated approaches for achieving multiple sequences from a single shift register structure. The multiple sequences may be desired for example for the structures demonstrated with reference to FIGS. 12 and 13 where the PSD flattening structure demands one sequence and the spectral line suppression structure demands one sequence. For the sake of not risk causing new kinds of spurs in the signal for the OOK structure, it is desired to have separate sequences in those cases, which sequences have limited mutual correlations. The approaches demonstrated with reference to FIGS. 14 to 16 have the advantage of keeping implementation complexity low.

An alternative way of flattening a signal as discussed above is taught in international application PCT/EP2018/066984, which is here incorporated by reference in its entirety. That approach comprises transmitting a first on-off keyed signal corresponding to the data symbols, the first signal comprising a plurality of on periods and a plurality of off periods. Each on period comprises a first signal portion cyclically shifted within the on period by a respective random or pseudorandom factor. The cyclic shifting of the first signal portion may be performed within the on period. For example, the first signal portion may be shifted in the on period by a factor such as a delay or percentage, and any part of the first signal that is shifted outside of the on period may be reintroduced into the on period at the opposite end of the on period. In this way, for example, the on period may in some examples remain filled with a signal formed from the first signal portion. In some examples, therefore, the first signal may have a flatter frequency response than other signals. In an example, Manchester coding may be applied to the data part of a wake up packet (WUP). For example, a logical "0" is encoded as "10" and a logical "1" as "01". Therefore, every data symbol comprises an "ON" part (where there is energy) and an "OFF" part, where there is no energy, wherein the order of these parts is dependent on the data symbol. In addition, the WUP may be generated in some examples by means of an inverse fast Fourier transform (IFFT), as this block may already be available in some transmitters such as for example Wi-Fi transmitters supporting e.g. IEEE 802.11a/g/n/ac. An example approach for generating the OOK signal representing a WUP is to use the 13 sub-carriers in the centre of an OFDM multi-carrier signal, and populating these 13 sub-carriers with a signal to represent ON and to not transmit anything at all to represent OFF, similar as demonstrated with reference to FIG. 3. This may be referred to as multicarrier OOK (MC-OOK). In one example, the IFFT has 64 points and is operating at a sampling rate of 20 MHz, and just as for ordinary orthogonal frequency division multiplexing (OFDM) a cyclic prefix (CP) is added after the IFFT operation in order to have the OFDM symbol duration as being used in 802.11a/g/n/ac. In some examples of MC-OOK for a WUP, the same OFDM symbol is used. In other words, the same frequency domain symbols are used to populate the non-zero subcarriers for all data symbols. Using the same OFDM symbol to generate the "ON" part of every Manchester coded data symbol may result in strong periodic time correlations in the data part of the WUP. These correlations give rise to spectral lines, which are spikes in the Power Spectral Density (PSD) of the WUP. These spectral lines may in some examples be undesirable because there may be local geographic regulations that limit the power that can be transmitted in narrow portions of the spectrum.

In a first example embodiment, a signal is transmitted from a single antenna. Suppose that the data part of the WUP consists of a number N of OFDM symbols. This example embodiment consists of the following steps:

1. Determine a set of K delays, K≥2. These are $\{T_1^{CS}, \ldots, T_K^{CS}\}$.
2. Generate a random or pseudorandom sequence consisting of N integers taking values between 1 and K. These are $\{m_1, \ldots, m_N\}$.
3. Apply a random or pseudorandom cyclic shift to each of the OFDM symbols corresponding to the "ON" parts of the data symbols, wherein the cyclic shift corresponds to one of the N integers in the sequence. For example, apply the delay $T_{m_n}^{CS}$ (a negative value) to the OFDM symbol corresponding to the "ON" part of the n-th data symbol. That is, if s(t), $0 \le t < T_s$ is the time domain signal corresponding to the "ON" part, having a duration then the cyclic shift $s_{CS}(t; T_{m_n}^{CS})$ of s(t) by the delay $T_{m_n}^{CS} \le 0$ is generated by setting:

$$s_{CS}(t; T_{m_n}^{CS}) = \begin{cases} s(t - T_{m_n}^{CS}) & \text{if } 0 \le t < T_s + T_{m_n}^{CS} \\ s(t - T_{m_n}^{CS} - T_s) & \text{if } T_{m_n}^{CS} + T_s \le t < T_s \end{cases}$$

4. Transmit the MC-OOK signal, comprising the cyclically shifted OFDM symbol $s_{CS}(t; T_{m_n}^{CS})$ in the "ON" part of the n-th data symbol.

In one particular example, $T_s=4$ μs. A set of K=8 cyclic shifts $\{T_1^{CS}, \ldots, T_8^{CS}\}$ is defined as shown in the table below.

| | |
|---|---|
| $T_1^{CS}$ | −0 ns |
| $T_2^{CS}$ | −400 ns |
| $T_3^{CS}$ | −800 ns |
| $T_4^{CS}$ | −1200 ns |
| $T_5^{CS}$ | −1600 ns |
| $T_6^{CS}$ | −2000 ns |
| $T_7^{CS}$ | −2400 ns |
| $T_8^{CS}$ | −2800 ns |

In another particular example, $T_s=2$ μs. A set of K=8 cyclic shifts $\{T_1^{CS}, \ldots, T_8^{CS}\}$ is defined as shown in the table below.

| | |
|---|---|
| $T_1^{CS}$ | −0 ns |
| $T_2^{CS}$ | −400 ns |
| $T_3^{CS}$ | −600 ns |
| $T_4^{CS}$ | −800 ns |
| $T_5^{CS}$ | −1000 ns |
| $T_6^{CS}$ | −1200 ns |
| $T_7^{CS}$ | −1400 ns |
| $T_8^{CS}$ | −1800 ns |

A sequence of random or pseudorandom integers having values between 1 and 8 is generated for each data symbol, and a cyclic shift by the corresponding delay is applied to the "ON" part of the signal for each data symbol. For example, if $T_s=2$ μs and the integer m generated for the n-th data symbol is 6, then a cyclic shift of $T_6^{CS}=1200$ ns is applied to the "ON" part of the n-th transmitted data symbol.

A suitable approach for generating pseudorandom sequence generation is desired for this solution as well for the approach demonstrated with reference to FIGS. 1 to 13. As an example, consider the case where K is a power of 2, i.e. $K=2^p$. The 802.11 standard utilizes the linear feedback shift register with generator polynomial $z^{-7}+z^{-4}+1$ to generate pseudorandom bit sequences. Any of these sequences can be used, by grouping the output in groups of p bits. Any such group can be mapped to an integer between 1 and K.

Another example embodiment involves transmission from multiple antennas (e.g. transmit diversity or spatial diversity). For each of the antennas, an MC-OOK signal is generated from data symbols according to any given multi-antenna transmit (TX) diversity technique. Then, the embodiment given for a single transmit antenna can be applied to a signal to be transmitted from each antenna. The TX diversity technique applied to the signals from the antennas may comprise delay diversity (e.g. as used in the GSM cellular system) or cyclic delay diversity (e.g. as used in the LTE cellular system).

In an example, suppose that there are L transmit antennas, MC-OOK is used, and CSD is the TX diversity technique employed by the transmitter. In this case, cyclic delays $\Delta_l$, $l=1, \ldots, L$ are applied to the OFDM symbol s(t). Thus, the signal transmitted through the l-th antenna is $s^l(t)=s_{CS}(t; \Delta^l)$, where $s_{CS}(t; \Delta^l)$ denotes the cyclic shift of s(t) by and is defined as given above for the single-antenna example. This example embodiment consists of the following steps:

1. Determine a set of K delays, K≥2. These are $\{T_1^{CS}, \ldots, T_K^{CS}\}$.
2. Generate a random or pseudorandom sequence consisting of N integers taking values between 1 and K. These are $\{m_1, \ldots, m_N\}$.
3. For each of the L antennas, apply the delay $T_{m_n}^{CS}$ (a negative value) to the OFDM symbol corresponding to the "ON" part of the data symbol. That is, if $s^l(t)$, $0 \le t < T^3$ is the time domain signal corresponding to the "ON" part, then for the l-th antenna, the cyclic shift of $s_{CS}^i(t; T_{m_n}^{CS})$ of $s^i(t)$ is generated by applying a cyclic delay by $T_{m_n}^{CS}$. Note the delay $T_{m_n}^{CS}$ may change from one data symbol to the next.

4. Transmit the MC-OOK signal, comprising the cyclically shifted OFDM symbol $s_{CS}^i(t; T_{m_n}^{CS})$ in the "ON" part of the n-th data symbol in the signal transmitted through the antenna.

As an example, if CSD is used, then:

$$s_{CS}^l(t; T_{m_n}^{CS}) =$$

$$s(t; \Delta_l + T_{m_n}^{CS}) = \begin{cases} s(t - \Delta_l - T_{m_n}^{CS}) & \text{if } 0 \le t < \Delta_l + T_s + T_{m_n}^{CS} \\ s(t - \Delta_l - T_{m_n}^{CS} - T_s) & \text{if } \Delta_l + T_{m_n}^{CS} + T_s \le t < T_s \end{cases}$$

Cyclic shift symbol randomization suppresses spectral lines and flattens the spectrum. In an example where $T_{sym}=4$ µs and there are 8 possible cyclic shifts, by 0 ns, 400 ns, 800 ns, 1200 ns, 1600 ns, 2000 ns, 2400 ns and 2800 ns.

A slight drawback of the cyclic shift symbol randomization technique is that it can't eliminate spectral lines arising from the DC component in the On waveform. A cyclic shift applied to an OFDM signal can be implemented by a rotation of the frequency domain symbols. Thus, when applied to OFDM waveforms, cyclic shift randomization can be thought of as randomization of the phases of the subcarriers. However, the rotation applied to the DC subcarrier by any cyclic shift is zero, and hence the phase of the DC subcarrier can't be randomized by means of cyclic shift randomization. A practical solution to this drawback may be to use waveforms without a DC component as On waveforms. This can be achieved by nulling or blanking the DC subcarrier of an OFDM waveform. However, there might be circumstances where having a non-null DC subcarrier is desirable, for example to have more degrees of freedom to optimize the On waveform for performance or for other metric.

Figure 17:
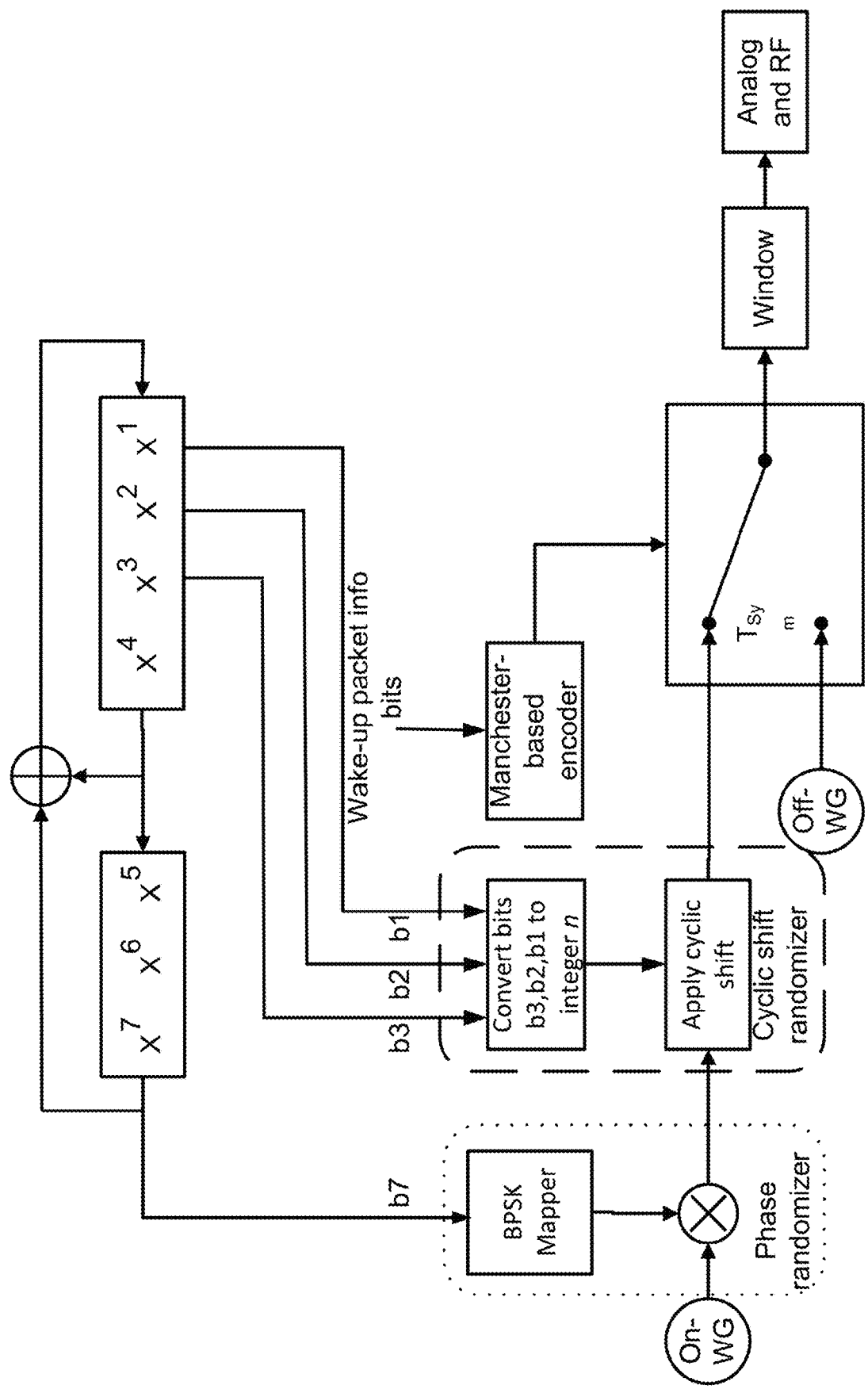
FIG. 17 schematically illustrates a transmitter according to an embodiment.

Symbol randomization techniques that suppress spectral lines as demonstrated with reference to FIG. 5 combined with cyclic shift randomization as demonstrated above provides for a low complexity technique to suppress spectral lines and flatten the spectrum. A structure for achieving this is illustrated in FIG. 17, where an example of a low-complexity sequence generation as will be demonstrated below is applied.

A well-known approach for generating pseudorandom sequences are the above-mentioned linear feedback shift register using a proper polynomial. Considering the approaches demonstrated herein for removal of spectral lines and flattening of spectral properties of a signal, there is a desire for an efficient and low-resource consuming solution for producing two or more sequences. Here, the two or more sequences are preferably having limited correlation not to risk introducing new undesired spurs in the signal. A straightforward solution is to have one generation mechanism for each sequence to generate, and to carefully select e.g. structure and polynomials of the respective generation mechanism to provide limited correlation. However, in this disclosure it is suggested an approach for generating two or more sequences from a single shift register structure where register elements and their states are reused for the different sequences. A basic sequence generated by the structure will have the same properties as of a linear feedback shift register. The additional generated sequences will not have the same characteristics but will have low enough correlation for the purposes of the signal shaping approaches of this disclosure and will also have sufficient performance for other applications where multiple sequences with low correlation is desired.

An approach according to this disclosure is implemented in a transmitting network node, such as an access point, AP. An embodiment is illustrated in FIG. 17. The LFSR is updated every $T_{sym}$.

Figure 14:
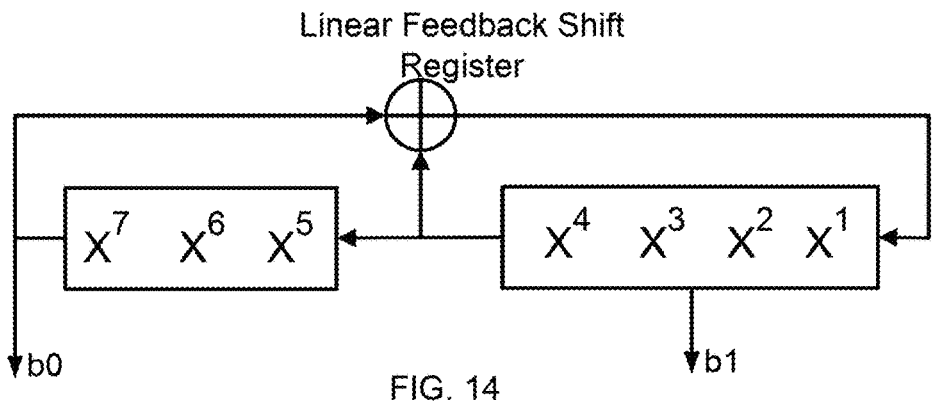
FIG. 14 schematically illustrates a linear feedback shift register for generating a first sequence and an addon tap to extract a second sequence according to an embodiment.

FIG. 14 schematically illustrates a linear feedback shift register for generating a first sequence and an addon tap to extract a second sequence according to an embodiment. The LFSR in this figure has generator polynomial $x^{-7}+x^{-4}+1$, but other generator polynomials can be used. Referring back to the Figs illustrating OOK, The LFSR is updated every symbol time, $T_{sym}$, and the bits b0 and b1 are read from different states of the LFSR. For example b0 may be extracted from the first position in the register, labelled $X^1$ in FIG. 14, while b1 may be extracted from the seventh position in the register, labelled $X^7$ in FIG. 14.

Figure 15:
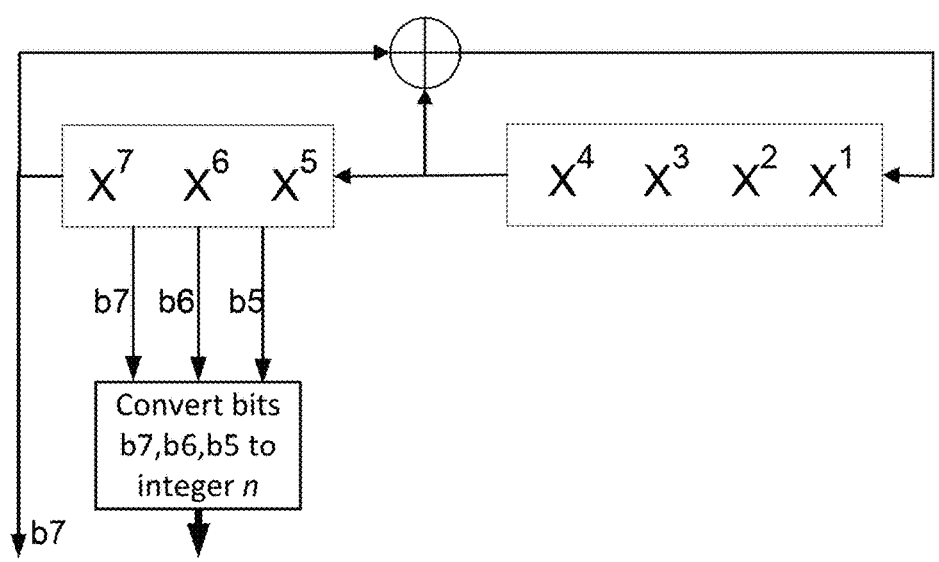
FIG. 15 schematically illustrates a linear feedback shift register for generating a first sequence and an addon tap mechanism to extract a second sequence according to an example.

FIG. 15 schematically illustrates a structure comprising a Linear Feedback Shift Register (LFSR) with generator polynomial $x^{-7}+x^{-4}+1$ where the structure is used to generate a pseudo-random bit sequence, but other polynomials could be used. The register contains seven elements labelled $X^1$ to $X^7$. The bits b5 to b7 are extracted from the elements 5 to 7 of the register. Moreover, the LFSR is updated every $T_{sym}$. Note that both phase randomization and cyclic shift randomization require a source of randomness, in order to generate random phase shifts and random cyclic shifts. Ideally, independent sources of randomness should be used. However, for ease of implementation the same LFSR is used to generate both the sequences.

Figure 18:
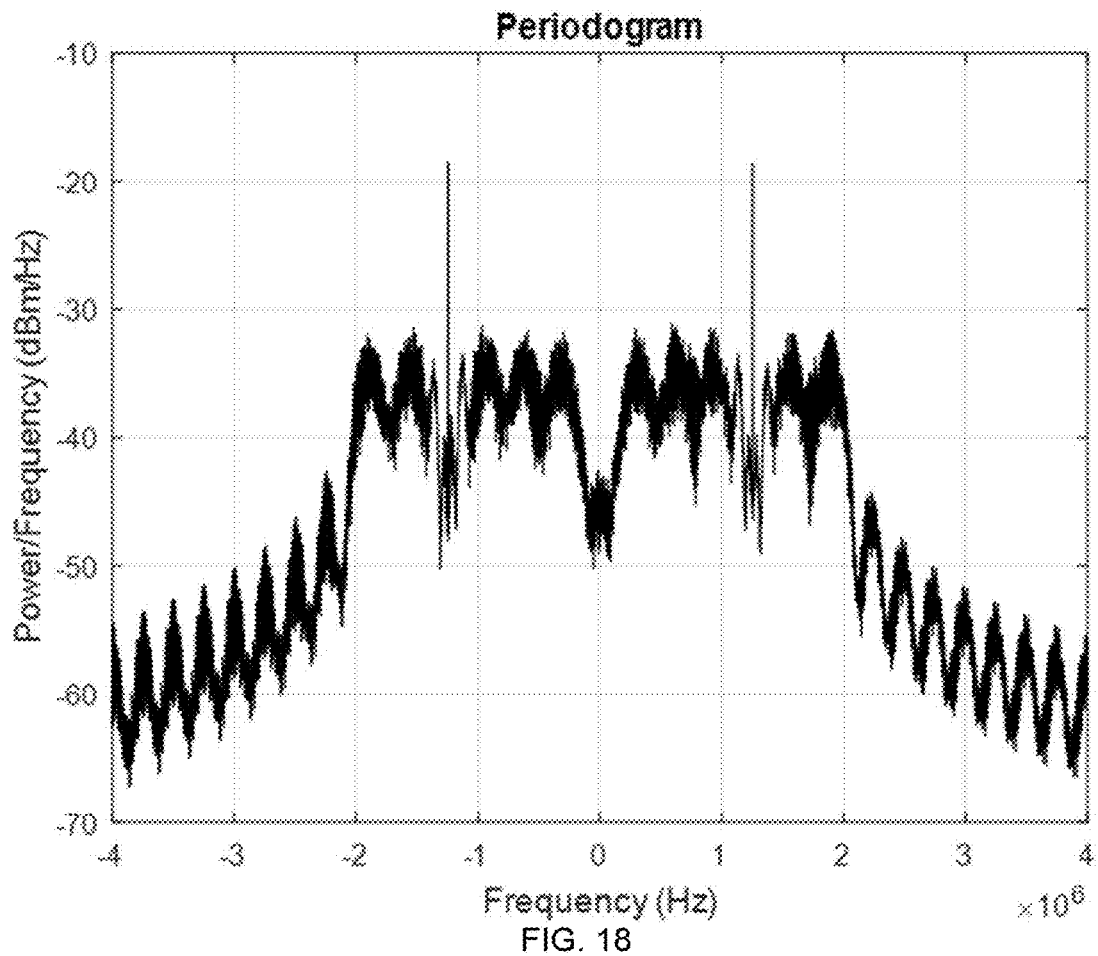
FIG. 18 is a signal diagram illustrating power spectral density of a basic baseband waveform generated when applying a structure as of FIG. 15.

A problem with the combined solution is that there is a strong correlation between the source of randomness used for the phase randomizer (i.e. b7) and the source of randomness for the cyclic shift randomizer (i.e. b5, b6, b7). In a combined flattening and spectral line suppression structure including e.g. a complex conjugation structure and a phase shifter, or a cyclic shifter and a phase shifter, this may cause remaining spectral lines as illustrated in the diagram of FIG. 18. The reason is that in this example cyclic shift randomization imparts a random phase shift by zero or 180 degrees to two of the subcarriers, but due to the perfect correlation, the phase randomizer reverses the 180 degrees phase shift, so that as a result these two subcarriers don't have their phase randomized, resulting in the two spectral lines shown in FIG. 18. In order to eliminate spectral lines, the phases applied to each subcarrier in the On waveform preferably have zero mean. But because of the strong correlations, they may fail to do so. As an illustration, suppose that there are 8 possible cyclic shifts, by 0 ns, 400 ns, 800 ns, 1200 ns, 1600 ns, 2000 ns, 2400 ns and 2800 ns.

Hence, since a symbol randomization technique based on a combination of phase randomization and cyclic shift randomization is desirable, and since due to ease of implementation it is also desirable to use only one LFSR as source of randomness for both randomization techniques, it is sought a method to achieve symbol randomization by means of a combination of phase randomization, cyclic shift randomization and using only one LFSR. The basic idea in the present disclosure is to create two sources of entropy or randomness from the same LFSR in such a way that the two randomization techniques are sufficiently decorrelated.

Figure 16:
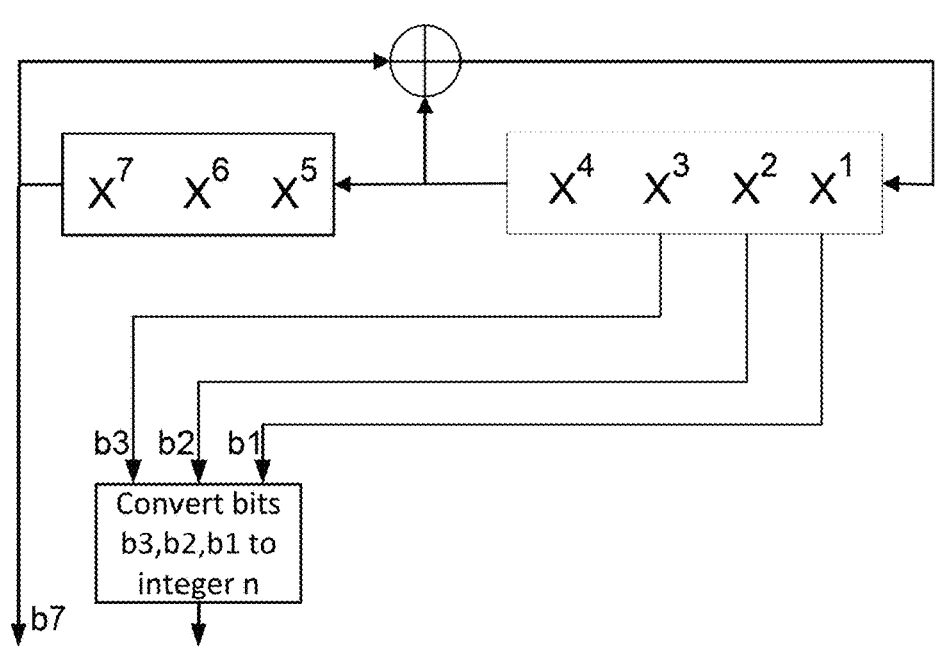
FIG. 16 schematically illustrates a linear feedback shift register for generating a first sequence and an addon tap mechanism to extract a second sequence according to an embodiment.

FIG. 16 schematically illustrates a structure comprising a Linear Feedback Shift Register (LFSR) with generator polynomial $x^{-7}+x^{-4}+1$ where the structure is used to generate a pseudo-random bit sequence, but other polynomials could be used. The register contains seven elements labelled $X^1$ to $X^7$. In FIG. 17 the source of randomness for the phase randomizer, enclosed by dotted lines, is labelled b7 and is a bit stream drawn from the seventh element $X^7$ in the register. The sources of randomness for the cyclic shift randomizer, enclosed by dashed lines, are labelled b1, b2, b3, and are three-bit streams drawn from the first, second and third elements of the register. This breaks the strong correlations between the randomness sources for the phase and cyclic shift randomizers.

The decreased correlation between the tapped sequences is achieved by choosing the source of randomness for a first sequence to depend on a first set of elements in the LFSR register, and to choose the sources of randomness for a second sequence to depend on a second set of elements of the register, such that the first and second sets are non-overlapping. The respective set may comprise one element, producing a binary sequence, or a plurality of sets, producing a higher order sequence, in any combination.

Although binary phase randomization is the simplest phase randomization technique, it is possible to use quaternary or higher order phase randomization techniques. As an illustration, in the case of quaternary phase randomization, for each occurrence of an On waveform, a randomly chosen phase of either 0, 90, 180 or 270 degrees is applied to said On waveform. Thus, it is necessary to choose randomly among 4 phases. This can be achieved by feeding bitstreams b1 and b2, drawn from elements 1 and 2 of the register, to the phase randomizer, and feeding bitstreams b5, b6, b7 drawn from elements 5, 6 and 7 of the register, to the cyclic shift randomizer. Once again, the key is that the two sets of elements of the register, namely {1,2} (used for phase randomization) and {5,6,7} (used for cyclic shift randomization) are non-overlapping.

Figure 19:
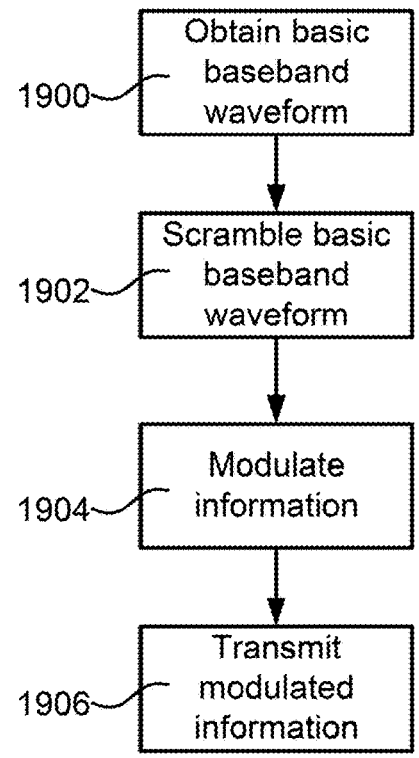
FIG. 19 is a flow chart illustrating a method according to an embodiment.

FIG. 19 is a flow chart schematically illustrating methods of this disclosure. The method is for transmitting an On-Off Keying, OOK, signal which comprises an ON waveform and an OFF waveform forming a pattern representing transmitted information. A basic baseband waveform is obtained 1900. The obtaining 1900 of the basic baseband waveform may comprise generating an Orthogonal Frequency Division Multiplex signal mimicking a desired baseband waveform. The basic baseband waveform is scrambled 1902 by applying a first binary randomised sequence where one of the binary values cause transformation to a complex conjugate. The scrambling 1902 of the basic baseband waveform may further comprise applying a second binary randomised sequence where binary values apply phase rotations which are mutually separated by π. The first randomised sequence may be generated in a shift register mechanism representing a first polynomial and the second randomised sequence may be generated in a shift mechanism representing a second polynomial different from the first polynomial. The shift register mechanism may use a single shift register for the generation of both the first and the second binary randomised sequences, where the first binary randomised sequence is tapped at a first position of the single shift register and the second binary randomised sequence is tapped at a second position of the single shift register, and the first and second positions of the single shift register are different.

The information to be transmitted is modulated 1904 by applying the scrambled basic baseband waveform for the ON waveform and applying no waveform for the OFF waveform. The modulated information is then transmitted 1906.

Figure 20:
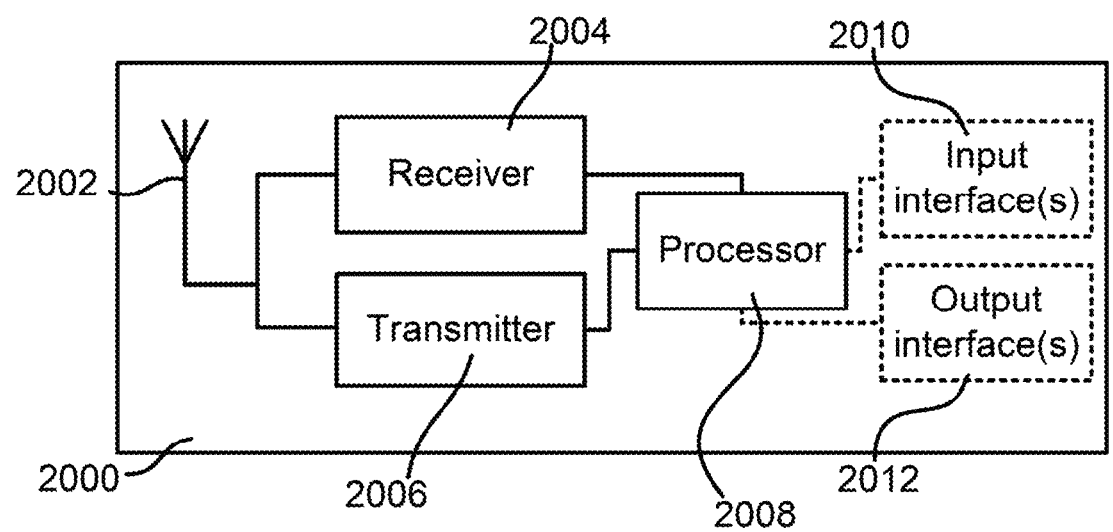
FIG. 20 is a block diagram schematically illustrating a network node according to an embodiment.

FIG. 20 is a block diagram schematically illustrating a network node 2000, e.g. an access point, according to an embodiment. The network node comprises an antenna arrangement 2002, a receiver 2004 connected to the antenna arrangement 2002, a transmitter 2006 connected to the antenna arrangement 2002, a processing element 2008 which may comprise one or more circuits, one or more input interfaces 2010 and one or more output interfaces 2012. The interfaces 2010, 2012 can be operator interfaces and/or signal interfaces, e.g. electrical or optical. The network node 2000 is arranged to operate in a cellular communication network. In particular, by the processing element 2008 being arranged to perform the features demonstrated with reference to FIG. 19, the network node 2000 is capable of efficiently providing WUPs and be implemented with low complexity. The processing element 2008 can also fulfill a multitude of tasks, ranging from signal processing to enable reception and transmission since it is connected to the receiver 2004 and transmitter 2006, executing applications, controlling the interfaces 2010, 2012, etc.

Figure 21:
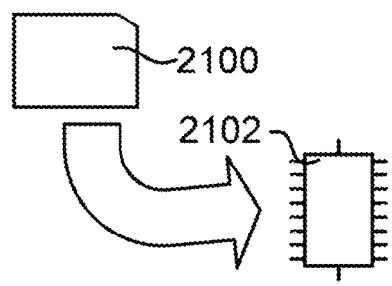
FIG. 21 schematically illustrates a computer-readable medium and a processing device.

The methods according to the present disclosure is suitable for implementation with aid of processing means, such as computers and/or processors, especially for the case where the processing element 2008 demonstrated above comprises a processor handling WUP provision. Therefore, there is provided computer programs, comprising instructions arranged to cause the processing means, processor, or computer to perform the steps of any of the methods according to any of the features described with reference to FIG. 19. The computer programs preferably comprise program code which is stored on a computer readable medium 2100, as illustrated in FIG. 21, which can be loaded and executed by a processing means, processor, or computer 2102 to cause it to perform the methods, respectively, according to embodiments of the present disclosure, preferably as any of the features described with reference to FIG. 19. The computer 2102 and computer program product 2100 can be arranged to execute the program code sequentially where actions of the any of the methods are performed stepwise or perform the methods on a real-time basis. The processing means, processor, or computer 2102 is preferably what normally is referred to as an embedded system. Thus, the depicted computer readable medium 2100 and computer 2102 in FIG. 21 should be construed to be for illustrative purposes only to provide understanding of the principle, and not to be construed as any direct illustration of the elements.

The invention claimed is:

1. A method of transmitting an On-Off Keying (OOK) signal having an ON waveform and an OFF waveform forming a pattern representing transmitted information, the method comprising:
generating a first randomized sequence;
applying a cyclic shift according to the first randomized sequence to each of a plurality of orthogonal frequency division multiplexed (OFDM) symbols corresponding to the ON waveform to form a scrambled waveform;
modulating information to be transmitted by applying the scrambled waveform for the ON waveform and applying no waveform for the OFF waveform; and
transmitting the modulated information.

2. The method of claim 1, wherein the cyclic shift is one of random and pseudorandom.

3. The method of claim 1, further comprising suppressing a DC component of the ON waveform.

4. The method of claim 1, wherein the cyclic shift includes rotation of the OFDM symbols corresponding to the ON waveform.

5. The method of claim 1, wherein the cyclic shift is implemented by a linear feedback shift register (LFSR).

6. The method of claim 1, further comprising performing a phase randomization of the OFDM symbols corresponding to the ON waveform.

7. The method of claim 1, wherein the first randomized sequence is generated in a shift register representing a first polynomial and a second randomized sequence is generated by the shift register representing a second polynomial.

8. The method of claim 1, wherein the cyclic shift is performed by a shift register tapped at a first position for random phase shifts of the OFDM symbols and tapped at a second position for random cyclic shift of the OFDM symbols.

9. The method of claim 8, wherein the first and second positions are selected to reduce a correlation between randomization sources for phase and cyclic shifts.

10. The method of claim 1, wherein the cyclic shift transforms a baseband waveform to a complex conjugate of the baseband waveform.

11. A transmitter configured to transmit an On-Off Keying (OOK) signal having an ON waveform and an OFF waveform forming a pattern representing transmitted information, the transmitter comprising:
   a scrambler configured to generate a first randomized sequence;
   a shift register in communication with the scrambler and configured to apply a cyclic shift according to the first randomized sequence to each of a plurality of orthogonal frequency division multiplexed (OFDM) symbols corresponding to the ON waveform to form a scrambled waveform;
   a modulator in communication with the shift register and configured to modulate information to be transmitted by applying the scrambled waveform for the ON waveform and applying no waveform for the OFF waveform; and
   a transmitter circuit in communication with the modulator and configured to transmit the modulated information.

12. The transmitter of claim 11, wherein the cyclic shift is one of random and pseudorandom.

13. The transmitter of claim 11, wherein the shift register is configured to suppress a DC component of the ON waveform.

14. The transmitter of claim 11, wherein the cyclic shift includes rotation of the OFDM symbols corresponding to the ON waveform.

15. The transmitter of claim 11, wherein the shift register is a linear feedback shift register (LFSR).

16. The transmitter of claim 11, wherein the shift register is further configured to perform a phase randomization of the OFDM symbols corresponding to the ON waveform.

17. The transmitter of claim 11, wherein the shift register represents a first polynomial and a second polynomial for providing a set of random phase shifts and a set of random cyclic shifts.

18. The transmitter of claim 11, wherein the shift register is tapped at a first position for random phase shifts of the OFDM symbols and tapped at a second position for random cyclic shift of the OFDM symbols.

19. The transmitter of claim 18, wherein the first and second positions are selected to reduce a correlation between randomization sources for phase and cyclic shifts.

20. The transmitter of claim 11, wherein the cyclic shift transforms a baseband waveform to a complex conjugate of the baseband waveform.

* * * * *